DIRECT VIEW STORAGE TUBE

Filed Sept. 12, 1956

INVENTORS: R. KOMPFNER
K. M. POOLE
BY David P. Kelley
ATTORNEY

United States Patent Office 2,879,442

Patented Mar. 24, 1959

2,879,442

DIRECT VIEW STORAGE TUBE

Rudolf Kompfner, Far Hills, and Kenneth M. Poole, New Providence, N.J., assignors to Bell Telephone Laboratories, Incorporated, New York, N.Y., a corporation of New York Application September 12, 1956, Serial No. 609,417

9 Claims. (Cl. 315—12)

This invention relates to cathode ray picture tubes and, more particularly, to such a tube which is capable of displaying a picture derived from a low bandwidth television signal such as may be transmitted over existing telephone lines.

Much thought has been directed to the application of the television medium to our present day telephones so that one may see as well as hear the other party in a telephone conversation. The advantages of such an arrangement in both industry and the home are readily apparent. It would, for instance, make more effective the transmission of scientific information since a drawing could be transmitted simultaneously with a conversation. It would also make possible visual inspection by a doctor of physical manifestations of an injury while his patient described over the telephone the associated discomforts. Obviously, a multitude of other uses and advantages are inherent in such a system. However, one of the major problems attending the adaptation of television to present telephones has been the large bandwidth requirements of most television signals for an acceptable image presentation. This precludes the transmission of these signals over existing low bandwidth capacity telephone lines.

One solution which has been proposed is the transmission of a succession of still pictures, each of which lasts about one second. Such a succession of pictures can be transmitted over existing telephone lines since the bandwidth requirements are sufficiently low (no more than 4000 cycles) and, further, the solution is considered to be practicable since a succession of one-second still pictures will give satisfactory image presentation to the telephone viewer in virtually all situations. However, implementation of this technique and a consequent realization of the union of television and telephone have been forestalled by the need for a practical tube which is capable of displaying such a succession of pictures without annoying interruption between successive pictures.

Attempts to satisfy this need have resulted in a display device comprising two complete cathode ray tubes and an optical arrangement for combining the images appearing on the screens of the two tubes, as disclosed in a copending application Serial No. 525,927, filed August 2, 1955, by M. A. Clark, R. L. Miller, and R. W. Sears. In the operation of this device, there is provided switching means for connecting the input signal to one tube during one picture and to the other tube during the next picture, so that alternate pictures appear on the screens of alternate tubes. The first picture is stored on one tube and then that picture is viewed as the next picture is being stored on the second tube. This process continues, each picture being viewed as the next is being stored, thus permitting the display of an uninterrupted sequence of pictures. Additionally, for viewing convenience the pictures of the two tubes are combined optically for presentation on a single viewing screen. This latter optical arrangement for combining the pictures of the two tubes requires additional switching means for blanking the output of each tube at times when the picture from the other tube is to be viewed. This device is sound in principle but it has a serious disadvantage in that it requires two tubes, extensive switching apparatus, and a suitable optical arrangement for combining the picture output from the two tubes.

Another picture tube arrangement for displaying an uninterrupted sequence of pictures is disclosed in a copending application Serial No. 545,164, filed November 7, 1955, by M. E. Hines and W. E. Kirkpatrick. This arrangement disadvantageously requires extensive switching circuitry.

It is a general object of this invention to achieve the display of an uninterrupted sequence of still pictures in a single tube in a simplified manner without extensive switching circuitry.

To this end a feature of the present invention is the use of two separate storage grids in a single cathode ray tube, together with associated circuitry for initially storing signal elements corresponding to one complete picture on the first storage grid, then transferring these stored picture elements by means of a flooding electron beam to the second storage grid, and finally displaying the picture information of the second grid on a luminescent screen by means of the flooding beam while a second picture is being stored on the first grid. By transferring the stored picture elements is meant modulating the flooding beam in accordance with such stored elements and then utilizing the beam so modulated to energize the second storage grid; it is not intended to imply that the stored picture elements which serve to modulate the flooding beam are necessarily erased in this process. This process is then repeated and so each picture is initially stored on the first grid, then transferred to the second grid, and finally displayed on the screen for viewing as the next picture is being stored, whereby there is displayed an uninterrupted sequence of pictures.

In one embodiment of the present invention there is provided a first electron gun for generating a pencil beam and a second electron gun for generating a flooding beam. The pencil beam is used for writing or storing and the flooding beam for viewing. In addition, there is provided in turn along the path of the flooding beam a first conductive grid for receiving an input signal to be viewed, a first storage grid, a second conductive grid, a second storage grid, a third conductive grid, and a luminescent viewing screen. Electron deflection means are provided for sweeping the pencil beam across the surface of the first storage grid for storing thereon a charge pattern which corresponds to the signal elements of one complete picture. During this time the potential of each of the grids is adjusted so that the flooding beam passes through the first storage grid without being modulated by the charge being stored. Then, at the end of one complete scan of the first storage grid and storage thereon of the signal elements of one complete picture, the writing beam is cut off by a blanking pulse and the potential of each of the various grids is adjusted, in a manner to be explained hereinafter, to permit erasure of any charge then existing on the second storage grid and in addition transfer to the second storage grid of the picture initially stored on the first. After this erasure and transfer to the second storage grid, the writing beam is unblanked and is again scanned across the surface of the first storage grid to store the elements of a second picture, and while this second picture is being stored the flooding beam displays the first picture, now on the second storage grid, on the luminescent screen for viewing. This process is repeated, each picture being initially stored on the first storage grid, then being transferred therefrom to the second storage grid, and finally being displayed on the luminescent screen for viewing while storage of the next picture is being stored.

This invention will be understood more clearly from the following description taken together with the accompanying drawing in which.

Figures 1, 2, 3:
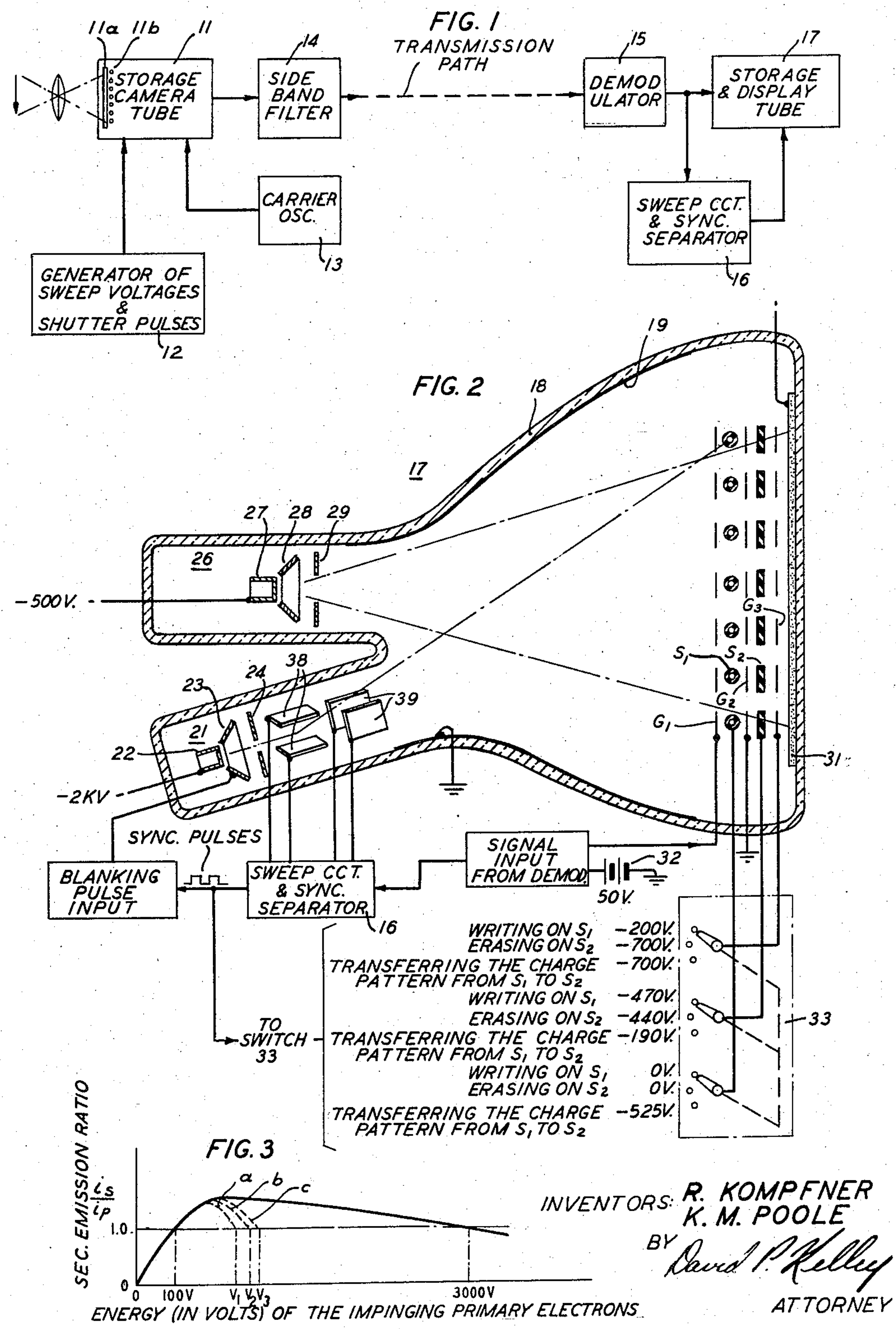
Fig. 1 shows a block diagram of a television system of the type in which a tube embodying the principles of the present invention is presently intended to be used.
Fig. 2 shows a longitudinal sectional view of a cathode ray tube embodying the principles of the present invention.
Fig. 3 shows a characteristic curve for the insulator material chosen by way of example for the storage surfaces of the tube of Fig. 2.

Referring now more particularly to the drawing, Fig. 1 shows a television system in which the display tube of the present invention may advantageously be employed. This system includes at its transmitter end a camera tube 11 of the storage type, a generator 12 for supplying sweep voltages and shutter pulses to the camera tube, an oscillator 13 for supplying a carrier signal to the camera tube, and a sideband filter 14 coupled to the output of the camera tube.

For our present purposes it will be sufficient to describe briefly the operation of this transmitter without describing in detail various known circuits for performing the functions of the various blocks. In operation, a light image appears on a photosensitive mosaic surface 11*a* of the camera tube 11. This tube includes a grid 11*b* which is spaced in close proximity to its photosensitive mosaic and is normally biased a few volts negative with respect to the mosaic for preventing the escape of photoelectrons. Positive shutter pulses of about 20 volts amplitude are applied to this grid from generator 12. Each time such a pulse appears on the grid photoelectrons are permitted to escape from the mosaic at a rate determined by the illumination of the light image. Thus during each shutter pulse a charge pattern corresponding to the light image is stored. This stored pattern remains on the mosaic surface until the next shutter pulse is supplied, at which time a new image pattern is stored. In the interim between successive shutter pulses the mosaic surface is scanned by an electron beam to produce a signal whose variations correspond to the stored image. Camera tubes which operate in this manner are known in the prior art, one such tube being the typical iconoscope film pickup tube. The signal so derived in tube 11 modulates a carrier wave from oscillator 13 and the modulated carrier thus formed is passed through filter 14 to obtain a single sideband signal for transmission. Advantageously, the time interval between successive shutter pulses is one second or more, so that the scanning rate results in the transmission of fewer signal elements in a fixed time and a consequent reduction in the bandwidth required for signal transmission. By this technique transmission of television signals over present day telephone lines can be accomplished.

This technique of storing an image and scanning it slowly, then storing a second image and scanning it slowly, and so forth, results in a signal which corresponds to a succession of still pictures, each of which has a duration equal to the interval between successive shutter pulses, which has been here chosen by way of example to be one second. This one second duration is also a measure of the frame time of the camera tube since in that time the image on the mosaic storage surface is completely scanned once.

At the receiver end of the transmission system of Fig. 1, there are provided a demodulator 15 for eliminating the carrier wave from the television signal received, suitable sweep circuits and a sync separator shown by block 16, and a storage type display tube 17 in accordance with the present invention. As the television signal derived from demodulator 15 is applied to display tube 17, an electron beam is swept over a storage grid of the tube. The voltages for sweeping this beam are provided by the sweep circuits of block 16 which are synchronized with the television signal to store one picture during each complete scan of the storage grid. The synchronization is accomplished by sending with the television signal from the transmitter a pulse train which is synchronized with the transmitter frame rate, for example the train of shutter pulses, then separating these pulses from the signal at the receiver by a conventional sync separator, shown by block 16, and applying them to the sweep circuits.

Fig. 2 shows a storage type display tube 17 illustrative of one specific embodiment of this invention and including an evacuated envelope 18 which is typically of glass and coated on its interior by a conductive material 19 to prevent accumulation of any undesired static charge on the glass surface, a first electron gun 21, a second electron gun 26, and several grids at the opposite end of the tube. The first electron gun comprises a cathode 22, beam forming electrode 23, and accelerating anode 24 for providing a pencil beam. The second gun 26 similarly comprises a cathode 27, beam forming electrode 28, and accelerating electrode 29 for providing a flooding beam. This flooding beam is directed toward a luminescent screen 31 at the right-hand end of the tube and spaced in turn along its length are a first conductive grid $G_1$ for receiving an input signal, a first storage grid $S_1$, a second conductive grid $G_2$, a second storage grid $S_2$, and a third conductive grid $G_3$. All of these lie in substantially parallel planes. The first storage grid consists of a succession of wire-like metallic elements each of which is covered at least on its side proximate the two electron guns, and preferably around its entire circumference, with an insulating layer such as silica or magnesium fluoride a few millimeters thick. Similarly, the second storage grid consists of a succession of wire-like metallic elements each of which is covered only on its side proximate the luminescent screen 31 with a like insulating layer.

In operation, cathode 27 of gun 26 is maintained at a potential slightly positive with respect to beam forming electrode 28 but substantially negative with respect to accelerating anode 29 and to the various grids at the screen end of the tube for projecting a low velocity flooding beam toward the screen end. Additionally, cathode 22 of gun 21 is maintained at a potential slightly positive with respect to beam forming electrode 23 but substantially negative with respect to accelerating anode 24 and to the various grids at the screen end of the tube for projecting a pencil beam. This cathode is maintained at a potential much lower than the cathode of the flooding beam gun in order to project the pencil beam at a high velocity. The pencil beam so projected passes through deflection plates 38 and 39, which are mutually perpendicularly disposed and are supplied with voltages from a suitable sweep circuit 16, and so is scanned across the surface of storage grid $S_1$ in a succession of lines. As the pencil beam is being swept across the surface of $S_1$, an input signal is applied to conductive grid $G_1$. Each elemental area of the surface of $S_1$, as it is struck by the beam, changes to substantially the instantaneous potential of $G_1$ and hence the voltage variations of this signal are translated to a spatial charge pattern on storage grid $S_1$. In practice grid $G_1$ is positively biased, for example by a battery 32, so that grid $G_1$ will be at a higher voltage than $G_2$ even when the negative-going half cycles of the input signal appear on $G_1$. This is to ensure that the surface of $S_1$ charges to the instantaneous voltage on $G_1$ rather than to the voltage of $G_2$, which is fixed at ground potential. Additionally, the scanning rate of the pencil beam is synchronized with the input signal so that the signal elements of one complete picture are stored during each complete scan of $S_1$. This is accomplished by applying the signal input to the sync separator circuit of block 16, which circuit separates the camera shutter pulses from the signal and applies them to the sweep circuit.

During the time that the pencil beam is sweeping the surface of $S_1$ for the first time, the flooding beam passes each of the grids without affecting them or being affected by them. At the end of the scan, a negative blanking pulse of 50 volts or so is applied to beam forming electrode 23 of the pencil beam gun to cut the pencil beam off. This pulse is advantageously synchronized with the scanning rate by means of the camera shutter pulses derived from sync separator 16. Additionally, the potential of the third conductive grid $G_3$ is reduced, by operation of switch 33 which is also synchronized by means of the camera shutter pulses from sync circuit 16, to a potential sufficient to prevent passage of the flooding beam and so this beam is turned back to strike the storage grid $S_2$. This serves to erase any existing charge of the surface of $S_2$. Then, leaving the potential of $G_3$ at the reduced value, the D.-C. potential of storage surface $S_1$ is decreased to a potential close to that of cathode 27 of the flooding beam. As a result of this, the electrons of the flooding beam are modulated as they pass this storage grid in accordance with the stored space charge pattern. The beam so modulated, still being turned back to strike storage grid $S_2$, serves to deposit thereon a charge pattern which corresponds to the beam modulation which, in turn, corresponds to the charge pattern initially stored on $S_1$. Thus the flooding beam transfers to $S_2$ the charge pattern that was initially deposited on $S_1$ by the pencil beam. At the end of this transfer time, the blanking pulse terminates and so the pencil beam goes back on, and the potentials of the various grids are returned directly to their initial values. The operating cycle is then repeated. However, during the second and all succeeding cycles as the pencil beam is scanning storage surface $S_1$ the charge pattern, which was transferred to $S_2$ on the preceding cycle, gives rises to a voltage variation which modulates the flooding beam to give a picture display on screen 31.

It is to be understood that while, for purposes of the explanation of this invention, switch 33 has been depicted as three ganged mechanical switch elements, the switch 33 would advantageously comprise logic and switching circuits of types well known in the art, the switching and logic circuits effecting operation of the switch 33 in response to output pulses from the sync separator circuit 16.

It will be helpful for a more complete understanding of the tube operation to envisage an exemplary material having characteristics which make it suitable for use as the storage surfaces of grids $S_1$ and $S_2$, and to set forth a typical set of operating potentials which are consistent with the characteristics of the exemplary material. To this end an insulator material having the characteristics shown in Fig. 3 is chosen. This may for example be quartz, glass, or a refractory oxide; the exact shape of the curve of course will depend on which of these materials is selected. In this figure the ratio of the secondary electrons $i_s$ emitted from the surface of the insulator to the primary electrons $i_p$ impinging on that surface is plotted along the ordinate and the voltage of the impinging primary electrons is plotted along the abscissa. It is characteristic of virtually every material that its surface will emit secondary electrons when it is struck with a stream of primary electrons and that the amount of secondaries emitted varies with the energy of the impinging electrons which, in turn, varies with the number and voltage level of the impinging electrons. The solid curve of Fig. 3 shows that this is true of the insulator material here chosen. More particularly, this curve shows that this material has a secondary emission ratio of unity (that is, the number of secondary electrons emitted equals the number of impinging electrons) when the impinging electrons are either at 100 volts or 3000 volts. This voltage is of course determined by the potential difference traversed by the impinging electrons in their path of travel, namely the difference in potential between the storage grid and the cathode supplying these electrons. It can be seen from the nature of the solid curve that when the chosen material is struck by a beam of primary electrons of less than 100 volts energy, that surface has a secondary emission ratio less than one and so charges negatively to the cathode potential but when struck by a primary electron beam of more than 100 volts energy, it has a secondary emission ratio greater than unity and so charges positively toward 3000 volts. Of course, in practice the high potential portion of the characteristic curve is modified substantially by the presence of a conductor proximate the insulator material which serves to collect the secondary electrons emitted from the insulator surface. Since that conductor acts as a collector for the secondary electrons emitted from the insulator, the insulator surface cannot charge to a potential higher than the potential of the conductor. Thus in the presence of a conductor maintained at a potential $V_1$, $V_2$, or $V_3$ the solid characteristic curve of Fig. 3 is modified approximately as shown by dashed curves *a*, *b*, or *c*, respectively. With these characteristics in mind we can now proceed to point out a set of typical operating potentials for achieving the desired operation.

At the start of the operating cycle the viewing or flooding beam is on, its cathode 27 being at 500 volts negative, and the writing or pencil beam whose cathode 22 is at 2000 volts negative is starting to scan the surface of storage grid $S_1$. At this time the potentials of the wire-like elements of this storage grid are maintained at zero volts, or ground potential, that of the wire-like elements of the second storage grid $S_2$ at 470 volts negative, and that of the third conductive grid $G_3$ at 200 volts negative. Additionally, the potential of grid $G_2$ is maintained at ground potential. This grid remains fixed at ground. It serves merely to shield storage grids $S_1$ and $S_2$ from each other and to collect any of the pencil beam electrons that are not intercepted by the surface of $S_1$. Since the potential difference between $S_1$ and the cathode of the writing beam is more than 100 volts, each elemental area of the surface of $S_1$ as it is struck by the pencil beam charges to the instantaneous potential of $G_1$ and so there is stored on $S_1$ a charge pattern which corresponds to one complete picture of the input signal applied to $G_1$. During this time the flooding beam passes through each of the grids without striking the storage surfaces since they are aligned with the conductive elements of the preceding grids and without being modulated by the charge being stored on $S_1$ since all parts of $S_1$ are at a much higher potential than the flooding beam cathode.

At the end of one scan of storage grid $S_1$ by the writing beam this beam is cut off by a negative-going blanking pulse applied to beam forming electrode 23. This pulse is typically 50 volts negative but may be of any amplitude sufficient to cut the writing beam off. By this time the surface of storage grid $S_1$ exhibits a charge pattern which corresponds to the signal elements of one complete picture. The individual elements of this pattern typically range in amplitude from about 5 to 45 volts. Simultaneously with blanking of the beam, the potentials of the various grids are adjusted by operation of the switch circuit 33 first to erase from storage grid $S_2$ any existing charge thereon and then to effect a transfer of the charge pattern from grid $S_1$ to grid $S_2$ so that the writing or pencil beam can commence storing a second picture on $S_1$. This is accomplished in two steps. First, for erasing $S_2$, the potential of its wire-like elements is switched to 440 volts negative and that of $G_3$ to 700 volts negative. This strong negative voltage on $G_3$ serves to reflect the electrons of the flooding beam so that they strike $S_2$ at 60 volts energy. It will be recalled that at this voltage the secondary emission ratio of the surface of $S_2$ is less than unity and so that the entire surface will charge to the viewing beam cathode potential, which is 500 volts negative. Thus the surface of $S_2$ is erased, and in the process acquires a charge of 60 volts negative with respect to its wire-like elements.

Next, the potential of $S_1$ is switched to 525 volts negative and that of $S_2$ to 190 volts negative, leaving $G_3$ at 700 volts negative. Since, as indicated above, the surface charge stored on $S_1$ ranges from 5 to 45 volts positive, that surface will now range from 520 to 480 volts negative, or from 20 volts positive to 20 volts negative with respect to the cathode of the flooding beam gun. Hence the flooding beam will be modulated as it passes $S_1$ in accordance with the charge pattern stored thereon, the beam current being greatest where the stored charge is most positive. The flooding beam so modulated continues toward screen 31 until it is reflected by the strong negative voltage of $G_3$ to strike $S_2$. But the potential of $S_2$ is now 250 volts negative (that is, the present 190 volt negative bias plus the 60 volt negative charge produced on its surface during erasure). Consequently the potential difference between this storage grid and cathode 27 of the flooding beam is more than 100 volts and so the secondary emission ratio of its surface is greater than unity. Hence the surface charges toward the potential of $G_2$ but is limited, since the transfer operation is of short duration, by the number of electrons impinging on it. So it acquires a charge pattern which corresponds to the modulation of the flooding beam and, in turn, to the charge pattern on the surface of $S_1$. Thus the charge pattern initially stored on grid $S_1$ is transferred to grid $S_2$.

Having completed the erasing and transfer periods, the potentials of elements $S_1$, $S_2$, and $G_3$ are returned to their initial values of zero, 470 volts negative, and 200 volts negative, respectively, and the blanking pulse on electrode 23 terminates, permitting the writing beam to come back on. The width of the blanking pulse must be adjusted to equal the duration of the erase and transfer periods. In practice, using an operating cycle of one second, the total time consumed by the erasure and transfer periods is of the order of one-hundredth of a second. During this one-hundredth of a second the screen will not be illuminated by the viewing beam since that beam is being reflected to $G_2$. However, the time duration is so short that no flicker will be observable by the unaided human eye even using a low persistence viewing screen.

During the scanning period of the second operating cycle, and of all subsequent cycles, the viewing beam as in the first cycle will pass $S_1$ without acquiring any modulation since the potential of $S_1$ is much higher than that of cathode 27 but, unlike the first cycle, the viewing beam will be modulated by the charge stored on the surface of $S_2$ since this surface contains a charge pattern whose individual elements are in the range of 30 volts positive to 30 volts negative with respect to the 500 volt negative potential of cathode 27 (since the wire-like elements of $S_2$ are then at 470 volts negative and the charge pattern thereon varies from zero to 60 volts with respect to those elements). In this manner each picture is initially stored on storage grid $S_1$, is then transferred to $S_2$, and finally is transferred from $S_2$ to the luminescent screen for viewing as the next picture is being stored on $S_1$. Accordingly, each picture is viewed as the next is being stored and so there is achieved a display of a sequence of still pictures with no interruption between successive ones that is visible to the observer.

Reference is made to a copending application Serial No. 609,383, now issued as U.S. Patent No. 2,824,260, February 18, 1958, filed even date herewith by C. C. Cutler, wherein a related invention is disclosed and claimed.

It is understood that the specific embodiment described is merely illustrative of the general principles of the present invention. Various other arrangements may be devised in the light of this disclosure by one skilled in the art without departing from the spirit and scope of this invention. For example, in the described embodiment the input signal is applied to a conductive grid adjacent the storage grid. However, it will be apparent to a worker skilled in the art that storage may be had by applying the input signal to modulate the pencil beam, for example by applying the input signal to beam forming electrode 23 of the pencil beam gun. In such a case the modulated beam serves to impart a charge pattern to the storage grid in accordance with the variations of the applied signal. Other changes will appear to one skilled in the art.

What is claimed is:

1. A cathode ray tube comprising a luminescent screen, a first storage grid spaced apart from said screen and positioned in a plane substantially parallel thereto, a first electron gun for producing a pencil beam and for projecting said pencil beam against the surface of said first storage grid, electron deflection means for sweeping said pencil beam across the surface of said storage grid for storing thereon a charge pattern which corresponds to the variations of an applied signal, a second storage grid extending in a plane substantially parallel to the first storage grid and interposed between said first storage grid and said luminescent screen, and means for sequentially erasing any existing charge from the second storage grid, then transferring the stored charge pattern from the first storage grid to the second, and finally displaying said stored charge pattern from the second storage grid onto the luminescent screen for viewing, said last-mentioned means including a second electron gun having a cathode and accelerating anode for producing a flooding beam and for projecting said flooding beam past said first and second storage grids in a direction toward the luminescent screen, and means for biasing the second storage grid with respect to that of the flooding beam cathode for imparting to the surface of said grid a secondary electron emission ratio of less than unity during the erase period, for biasing the first storage grid to modulate the flooding beam during transfer of the charge pattern from the first storage grid to the second, and for biasing the second storage grid to modulate the flooding beam during transfer of the charge pattern to the luminescent screen.

2. A cathode ray tube comprising a luminescent screen, a first storage grid spaced apart from said screen and positioned in a plane substantially parallel thereto, a first electron gun for producing a pencil beam and for projecting said pencil beam against the surface of said first storage grid, electron deflection means for sweeping said pencil beam across the surface of said storage grid for storing thereon a charge pattern which corresponds to the variations of an applied signal, a second electron gun for producing a flooding beam and for directing said flooding beam past said first storage grid in the direction toward the luminescent screen, a second storage grid interposed between said first storage grid and said luminescent screen, said second storage grid having a storage surface only on the side facing the luminescent screen and away from the flooding beam gun, and means for deflecting the electrons of said flooding beam to strike said storage surface for erasing any existing charge from said surface and for displaying onto said surface the charge pattern initially stored on the first storage grid.

3. An electron discharge device comprising an electron gun for forming a pencil electron beam and an electron gun for forming a flooding electron beam, a first storage element in the path of said pencil beam and past which is projected said flooding beam, electron deflection means for sweeping said pencil beam across the surface of said storage element for storing thereon a charge pattern in accordance with the variations of an applied signal, means for periodically biasing said first storage element with respect to said flooding beam cathode to prevent modulation of said flooding beam during passage therethrough, a second storage element past which is projected said flooding beam for modulating said beam in accordance with a charge pattern thereon, a luminescent target in the path of said modulated flooding beam, and means including the flooding beam for periodically depositing on said second storage element a charge pattern corresponding to the charge pattern on said first storage element.

4. An electron discharge device comprising an electron gun for forming a pencil electron beam and an electron gun for forming a flooding electron beam, a first storage element in the path of said pencil beam and past which is projected said flooding beam, electron deflection means for sweeping said pencil beam across the surface of said storage element for storing thereon a charge pattern in accordance with the variations of an applied signal, means for periodically biasing said first storage element with respect to said flooding beam cathode to prevent modulation of said flooding beam during passage therethrough, a second storage element past which is projected said flooding beam for modulating said beam in accordance with a charge pattern thereon, a luminescent target in the path of said modulated flooding beam, and means including the flooding beam for periodically erasing the charge pattern on said second storage element and thereafter depositing thereon a charge pattern corresponding to the charge pattern on said first storage element.

5. An electron discharge device comprising an electron gun for forming a pencil electron beam and an electron gun for forming a flooding electron beam, a first storage element in the path of said pencil beam and past which is projected said flooding beam, electron deflection means for sweeping said pencil beam across the surface of said storage element for storing thereon a charge pattern in accordance with the variations of an applied signal, means for periodically biasing said first storage element with respect to said flooding beam cathode to prevent modulation of said flooding beam during passage therethrough, a second storage element past which is projected said flooding beam for modulating said beam in accordance with a charge pattern thereon, a luminescent target in the path of said modulated flooding beam for displaying a picture in accordance with the charge pattern on said second storage element, means including the flooding beam for periodically erasing the charge pattern on said second storage element and thereafter depositing a charge pattern thereon corresponding to the charge pattern on said first storage element, and means for applying a blanking pulse to the pencil beam gun for cutting off the pencil beam during said erasing and depositing operations.

6. A cathode ray tube comprising a first electron gun for producing a flooding beam and for projecting said flooding beam along a predetermined path, a luminescent screen extending athwart said path for energization thereof by the flooding beam, a first storage grid extending athwart the beam path between the first electron gun and the luminescent screen, a second storage grid similarly extending athwart the flooding beam path and positioned between the first storage grid and the luminescent screen, a second electron gun for producing a pencil beam and for projecting said pencil beam against the first storage grid, electron deflection means for sweeping said pencil beam across the surface of said first storage grid for storage thereon of a charge pattern corresponding to the variations of an applied signal, means for cutting off said pencil beam for a predetermined time at the end of said scan and for simultaneously modulating the flooding beam with the charge pattern stored on the first storage grid whereby that charge pattern is transferred to the second storage grid, and means for again sweeping the pencil beam across the surface of the first storage grid in a complete scan and for simultaneously modulating the flooding beam with the charge pattern on the second storage grid whereby that charge pattern on the second storage grid is displayed onto the luminescent screen.

7. A cathode ray tube including an envelope, a luminescent screen at one end of said envelope, first electron gun means for producing a pencil beam and second electron gun means for producing a flooding beam, both said electron gun means being positioned toward the other end of said envelope, and an electrode array positioned adjacent said screen and between said gun means and said screen, said array comprising, in order from said gun means, a first storage grid, a first control electrode, a second storage grid, and a second control electrode.

8. A cathode ray tube in accordance with claim 7 wherein said first storage grid includes secondary emitting material at least on the portions thereof toward said gun means and said second storage grid includes secondary emitting material only on the portions thereof toward said screen.

9. A cathode ray tube in accordance with claim 8 wherein said array further comprises a signal grid interposed between said first storage grid and said gun means.

References Cited in the file of this patent

UNITED STATES PATENTS

| | | |
|---|---|---|
| 2,322,361 | Iams | June 22, 1943 |
| 2,532,339 | Schlesinger | Dec. 5, 1950 |
| 2,790,929 | Herman | Apr. 30, 1957 |